United States Patent [19]
Suarez-Gonzalez et al.

[11] Patent Number: 5,125,739
[45] Date of Patent: Jun. 30, 1992

[54] TRIPLE SPECTRAL AREA PYROMETER

[75] Inventors: Ernesto Suarez-Gonzalez, Tequesta; Raymond L. Oqlukian, North Palm Beach, both of Fla.

[73] Assignee: United Technologies Corporation, Hartford, Conn.

[21] Appl. No.: 640,758

[22] Filed: Jan. 14, 1991

[51] Int. Cl.⁵ .............................. G01J 5/30; G01J 3/51
[52] U.S. Cl. ...................................... 356/45; 250/226; 356/407; 356/419
[58] Field of Search ............... 356/43, 45, 402, 406, 356/407, 419; 250/226

[56] References Cited

U.S. PATENT DOCUMENTS

| | | | |
|---|---|---|---|
| 4,142,417 | 3/1979 | Cashdollar et al. | 356/45 X |
| 4,411,519 | 10/1983 | Tagami | 356/406 X |
| 4,681,434 | 7/1987 | Kepple | 356/45 |
| 4,708,474 | 11/1987 | Suarez-Gonzalez | 356/45 |

Primary Examiner—Vincent P. McGraw
Attorney, Agent, or Firm—McCormick, Paulding & Huber

[57] ABSTRACT

An optical pyrometer for use with jet engines is characterized by the use of three spectral areas or bands in a temperature computation. A target temperature is optically distinguished from background radiation by dividing a received optical beam into three spectral components which are comprised of emitted and reflected radiation. A controller computes the measured power in each band as a function of the emitted power by the target and a ratio of reflected power in adjacent bands to yield signals of reflection corrected radiation. These are used with the reflected power ratios to determine values of temperature in adjacent bands. The difference between these computed temperatures is iteratively adjusted until the difference therebetween is approximately equal to a preselected value.

22 Claims, 4 Drawing Sheets

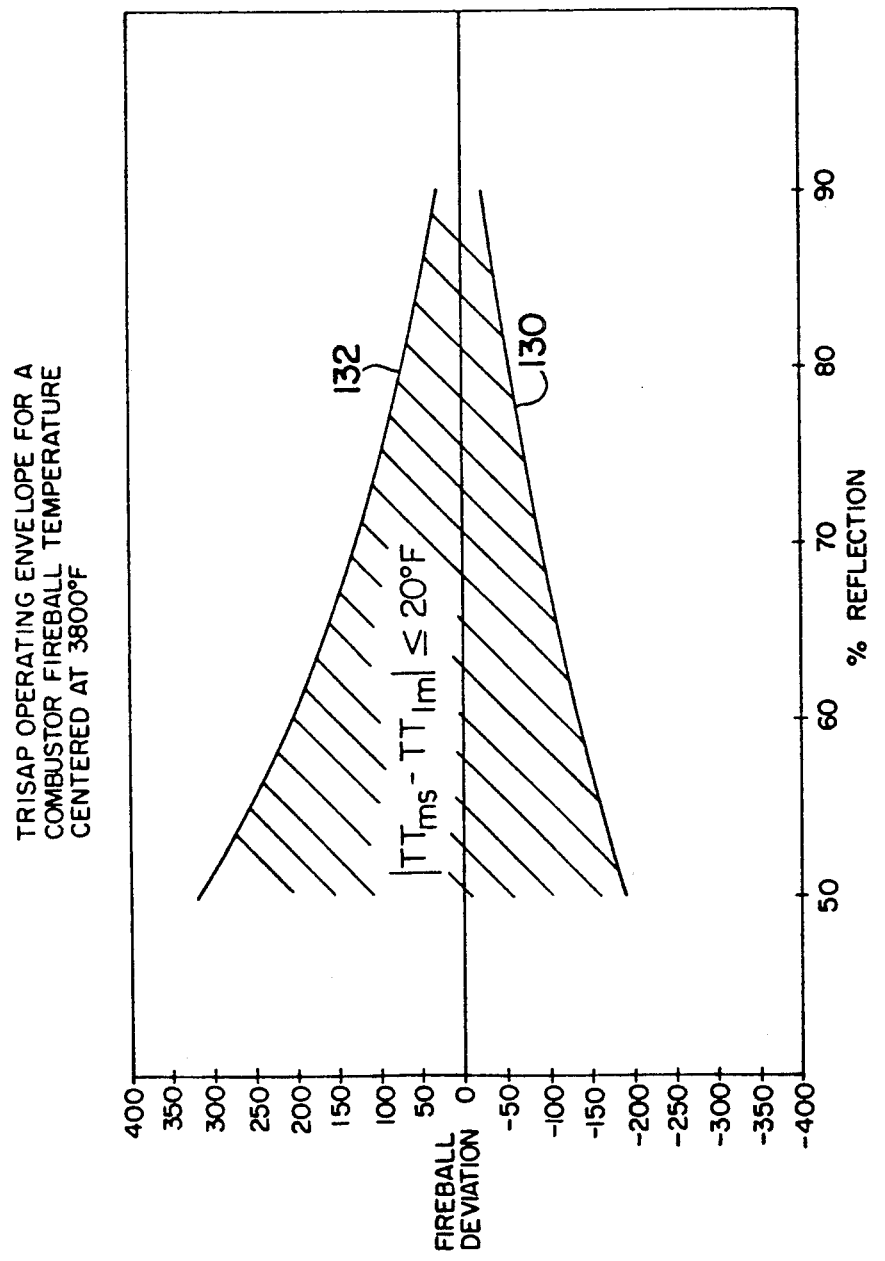

TRIPLE SPECTRAL AREA PYROMETER

TECHNICAL FIELD

This invention relates to optical pyrometers and more particularly to optical pyrometers that use three spectral areas.

BACKGROUND OF THE INVENTION

Optical pyrometers are well known in the art having found extensive use in applications in severe environments or where temperature magnitudes prohibit the use of conventional contact pyrometric techniques. These devices calculate the temperature of a target from the radiant energy provided therefrom. An algorithm is used to determine the temperature of the surface by measuring total radiation in a given wavelength interval or by looking at the distribution of optical energy as a function of wavelength. The higher the temperature of the source, the greater the proportion of optical energy in the shorter wavelengths.

Optical pyrometers have been developed to measure the temperature of turbine blade surfaces even in an operating jet engine whose environment necessarily includes the combustion flame fireball. To accurately measure the turbine blade temperature, the optical pyrometer must be capable of correcting the measurements to eliminate the effect of the presence of reflected combustion flame radiation which is mixed in and obscures radiation from the turbine blade.

Dual spectral area optical pyrometers have been developed in order to differentiate between reflected and emitted radiation received from a target turbine blade and compensate for the error in the observed temperature that the reflected radiation introduces. In U.S. Pat. No 4,222,663, Gebhart et al. discloses dual band (two color) optical pyrometer which comprises two separate pyrometers. Each pyrometer sees a different but overlapping component of the total spectral range of the light or radiation from the turbine blade.

The pyrometers are sensitive at different wavelength bands and will be affected differently by the energy from the turbine blade surface. When the light (radiation) from the fireball is reflected off the blade, the pyrometer set to detect the shorter wavelength band is more responsive to the additional reflected energy, and its output signal increases in greater proportion than does that of the longer Wavelength pyrometer. Therefore, an increase or decrease in the amount of the reflected radiation or, at high reflection conditions, to the radiation temperature of the combustion flame will result in a proportionally higher or lower value of temperature indicated in the short wavelength pyrometer relative to the indicated temperature in the long Wavelength pyrometer.

For each pyrometer an algorithm calculates the temperature of the turbine blade from the light it receives. This process, which requires linearizing the relationship between the received power and temperature, is complex and degrades the temporal responsivity of the system. The linearized temperature signals indicate the equivalent blackbody temperature of the turbine blade. However, the reflected energy of the much hotter combustion flame will cause each of the two pyrometers to yield different temperature values, both higher than the true blade temperature. An additional temperature correction algorithm receives each channel temperature and determines the magnitude of the temperature error.

The temperature correction signal is a function of the difference between the two pyrometer temperatures, which result from the spectral range of each pyrometer, the results from the spectral range of each pyrometer, the fireball equivalent blackbody temperature and the fraction of reflected radiation present in each pyrometer signal.

Reflection corrected radiosity optical pyrometers are disclosed in U.S. Pat. Nos. 4,708,474 and 4,222,663, each incorporated herein by reference, and generally include an optical guide for receiving from the target an optical beam that has a spectral width and has an emitted component from the target and a reflected component from a fireball that has an equivalent temperature. A detector module receives and divides the target optical beam into first and second optical beams and provides electrical signal equivalents thereof. The second optical beam is selected to have a spectral width that is a portion of the target beam spectral width. The pyrometer described in the '476 patent also includes a signal processor that provides for receiving the first and second signals as well as an energy ratio signal of the combustor fireball. The signal processor provides reflection corrected energy signals from a difference between the first signal and the product of the energy ratio signal and the second signal.

The dual spectral area pyrometers DSAP) found in the '663 discloses a reflection correction technique based on the principle that two blackbody calibrated pyrometers, each sensitive to different spectral wavelengths, will not respond equally when subjected to a radiative signal containing surface emitted and reflected radiation from a significantly higher temperature source. The pyrometer spectral ranges of operation are selected to provide sufficient sensitivity between the surface emitted radiation and the reflected component. The temperature difference between the two pyrometers is an indication of the magnitude of the reflected component.

SUMMARY OF INVENTION

An object of the present invention is to provide an optical pyrometer for measuring the temperature of a target whose output signal is compensated for spurious radiation reflected from the target.

Another object of the present invention is to provide an optical pyrometer that divides an incoming optical beam from the target into three spectral areas.

Still another object of the present invention is to provide an optical pyrometer that allows for simultaneous measurement of reflected and emitted radiation in the optical beam.

According to the present invention, a pyrometer for measuring the temperature of a remote target receives a target optical beam having a spectral width and a beam power that includes an emitted component and a reflected component. A detection module divides the target optical beam into three optical sub-beams each having a subportion of the optical beam spectral width and power and provides respective electrical signal equivalents of the received power in the optical sub-beams. A signal processor having a memory stores signals, including signals indicative of a plurality of target temperature value signals corresponding to associated ones of a plurality of reflection corrected energy signal magnitudes for each one of the optical beam spectral width subportion, and stores reflected energy ratio signals indicative of the ratio of reflected energy signal magnitudes between the optical beam spectral width subportions. The signal processor selects initial values of said ratios of reflected energy signal magnitudes between the optical beam spectral width subportion and computes target emitted beam power as a function of the measured optical beam power. Also, the signal processor calculates reflection corrected energy signal magnitudes as the difference signal magnitude between electrical signal equivalents of a second one of the optical sub-beam power signals and the product of a first one of the optical sub-beam power signals and a ratio of reflected power signal values in the first and second optical sub-beams. For each of said reflection corrected energy signal magnitudes, the signal processor computes corresponding ones of the plurality of target temperature value signals and compares a resolution temperature difference value signal with a signal corresponding to the difference between the identified target temperature signal values. If the comparison is within selected limits, output signals indicative of correct target temperatures are provided by the signal processor. Otherwise, new target temperatures are calculated using other values of reflected energy ratios and reflection corrected signals until the comparison is within selected limits.

BRIEF DESCRIPTION OF THE DRAWINGS

FIG. 9 illustrates a calculated temperature range as a function of percent reflection for the pyrometer of FIG. 1.

BEST MODE FOR CARRYING OUT THE INVENTION

Figure 1:
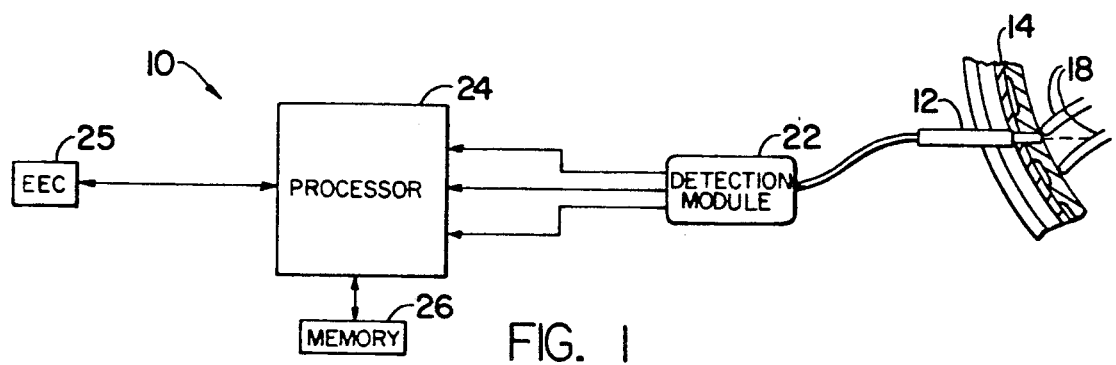
FIG. 1 is a simplified block diagram of an optical pyrometer provided according to the present invention.

Referring first to FIG. 1, in a simplified block diagram of a triple spectral area pyrometer TRISAP) 10 provided according to the present invention includes a probe 12 mounted in a casing 14 of a gas turbine jet engine. The probe should be positioned to optically view a target such as rotating turbine blades 16 and 18.

In an operating jet engine the blades of the turbine emit thermal radiation which comprises an optical beam, the intensity and spectral distribution of Which is described by Planck's Law of Radiation. A perfect emitting surface is known as a "black body". If variations in emissivity are taken into account, the approximation is conventionally referred to as a "grey body". In addition, light from the jet engine combustion flame or fireball is reflected off the turbine blade. The temperature of the fireball is substantially higher than that of the turbine blade, and the sum of the two light beams produces a beam whose spectral energy distribution yields an equivalent black body temperature higher than the actual temperature of the turbine blade.

The sum spectral energy, or target optical beam, from the turbine blades is collected by the probe. The probe may include lenses and such other optical components as is necessary to enhance the probe's light gathering and focusing capabilities. In other aspects, the probe is of a conventional design and includes such elements as a housing for the optical fiber, internal optical reflection damping mechanisms, and provisions for purge gas flow through the probe housing. Those skilled in the art Will recognize that substitutions and modifications can be made depending upon the pyrometer's use as a diagnostic or inflight pyrometer, and depending on engine type An optical guide 20 provides the target optical beam to the detection module 22. Typically the optical guide comprises a fused fiber optic bundle, or equivalently, a conventional wide band quartz or fused silica fiber. The pyrometer also includes a processor 24 which incorporates a microcomputer of a type known in the art and a memory 26 associated therewith. The microcomputer and memory are programmed to measure the temperature in accordance with algorithms detailed hereinafter, and communicate with an engine electronic control 25.

In jet engine development pyrometers are used to substantiate turbine blade cooling design. Pyrometers in these applications are subject to optical signal interference from reflected combustor radiation and emission from burning particles in he field of view. These conditions cause the pyrometer to indicate an incorrect temperature. The present invention is capable of operation at twice the level of reflected combustor radiation of known systems. The use of three spectral bands (triple spectral area) allows for simultaneous measurement of reflected and emitted radiation in the optical beam.

Radiation pyrometry provides a means for surface temperature measurement Without perturbing the surface or surrounding medium. The pyrometer operates by collecting thermal radiation from an area on the surface and transferring it optically to a detector to produce an electrical signal proportional to the radiant power. The signal is related to a surface temperature by using Planck's Law of Radiation and appropriate corrections for surface emissivity.

The presence of reflected radiation from the engine combustor significantly contributes to the radiation emitted by the surface, resulting in an erroneously high temperature indication. Radiation measurements in current test and production jet engines indicate that as much as 80 percent of the radiant flux collected by known pyrometers between the wavelengths 0.35 and 1.15 microns can be reflected energy. At this level of reflected energy, a pyrometer viewing a surface with an actual temperature of 1800 degrees Fahrenheit would indicate a temperature 200 degrees higher. Measurement techniques such a the Dual Spectral Area Pyrometers (DSAP) disclosed in the '474 and '663 patents can be used to correct for up to 50 percent reflected radiation.

The pyrometers disclosed in the '474 and '663 patents correct for reflected radiation under the following conditions:

(1) The spectral characteristics of the source of reflection are constant and significantly different from that of the target blade.
(2) All surfaces are gray, and have relatively high emissivities.
(3) There are no large temperature differences between the surface being measured and the immediate surrounding surfaces.

Figure 2:
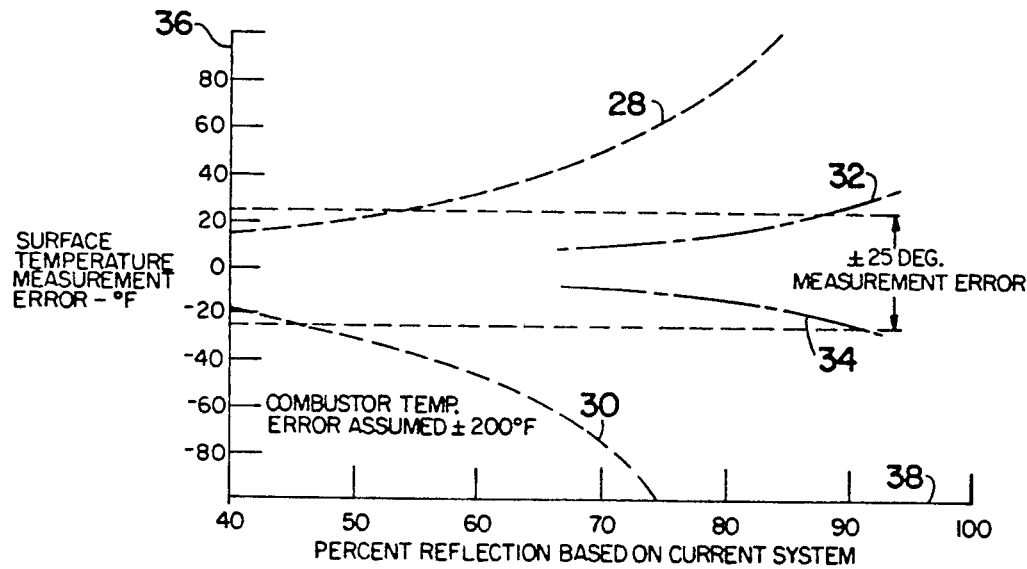
FIG. 2 shows the correction error by using a constant combustor radiance temperature (DSAP) pyrometer and the error using the pyrometer of FIG. 1

High levels of reflection coupled with the variability of the spectral characteristics of the reflected component (a violation of condition 1, above) lead to significant errors. FIG. 2 shows the correction error by using a constant combustor radiance temperature DSAP pyrometer (curves 28, 30) and the error using the pyrometer 10 which calculates the actual combustor radiance temperature for every surface temperature to be corrected (curves 32, 34). In FIG. 2, axis 36 corresponds to surface temperature measurement error in degrees Farhenheit while axis 38 corresponds to the percent reflection (in a given optical beam) based on a constant combustor radiance temperature (DSAP) pyrometer. The error value is the difference between the indicated temperature and the actual blade temperature 1900 deg F., and is plotted as a function of the level of reflection present in the unfiltered optical beam and combustor radiance temperature. The error increases with the level of reflection, and with the deviation from the assumed combustor radiance temperature. Note that the combustor temperature error in FIG. 2 is assumed to be plus or minus 200° F. Triple Spectral Area Pyrometry (TRISAP) as provided according to the Present invention minimizes this error by measuring the spectral characteristics of the reflected component. Under the aforementioned conditions, the DSAP system has an approximate measurement error of 25° F. at a 50 percent reflection level. With the TRISAP system the same error occurs at reflection levels in excess of 85 percent.

The present pyrometer employs three spectral bands to determine the value of the spectral ratio for the reflected component used to calculate temperature correction for every data point. The preferred spectral bands are:

| short band | 0.3 to 0.85 | microns |
|---|---|---|
| middle band | 0.85 to 1.0 | microns |
| long band | 1.0 to 1.8 | microns |

Other spectral bands may be used if adequate signal to noise and sensitivity to the reflected component are provided: including 0.4 to 0.7, 0.4 to 0.85 and 0.4 to 1.15 microns.

Figure 3:
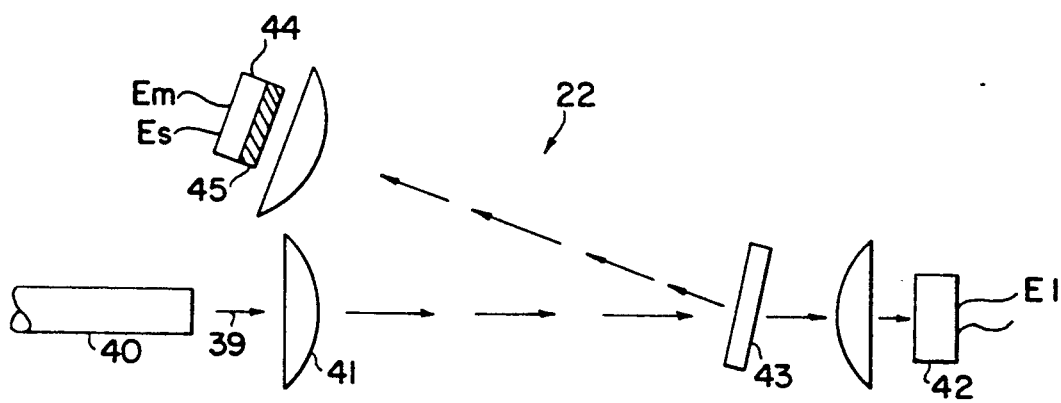
FIG. 3 is a simplified schematic illustration of a detection module used by the optical pyrometer of FIG. 1.

The input radiation from the turbine blade is divided into the respective bands in the detection module. As shown in FIG. 3, the preferred detection module receives an optical beam 39 from fiber optic cable 40. The detection module includes focusing optics 41 and further consists of three detectors each having a different spectral sensitivity. Included therein is a silicon detector 42 optically filtered by filter 43 to be sensitive to wavelengths below 0.85 microns. The remaining optical beam is reflected to silicon and Indium Gallium Arsenide detectors in an integrated arrangement or "sandwich" configuration. The silicon detector 45 is sensitive to wavelengths from 0.85 to 1.0 microns. Wavelengths above 1.0 micron are received by an Indium Gallium Arsenide detector 44 sensitive to Wavelengths from 1.0 to 1.8. The output signal for each band is proportional to the radiant power in the wavelengths of the respective spectral bands.

Figure 4:
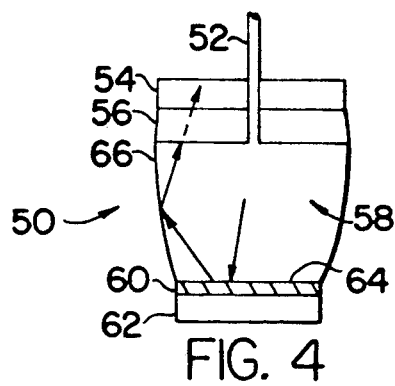
FIG. 4 is a simplified schematic illustration of a first alternative detection module.

A first alternative detection module 50 is shown in FIG. 4 and includes detectors in "sandwich" or integrated arrangement. The optical beam is provided along a fiber optic cable 52 directly through an opening in a sequence of detectors 54, 56 into a reflector cavity 58. A short wavelength filter 60 is placed at a distal end of the reflector cavity to receive the optical beam. Registered therewith is a short wavelength detector 62. A sub-beam containing the long and medium wavelengths is reflected off of a reflective surface 64 on a detection module wall 66. Detector 56 absorbs the medium wavelength band portion of the optical beam and provides electrical signals indicative of the intensity thereof while acting as a filter for long wavelength detector 54 registered therewith.

Figure 5:
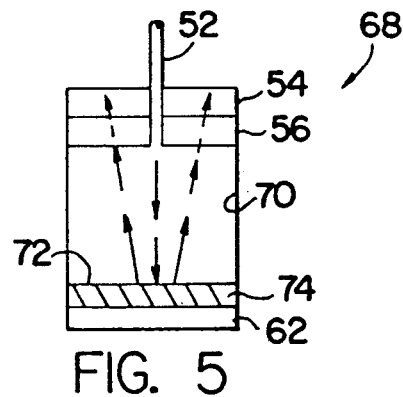
FIG. 5 is a simplified schematic illustration of a second alternative detection module.
Figure 6:
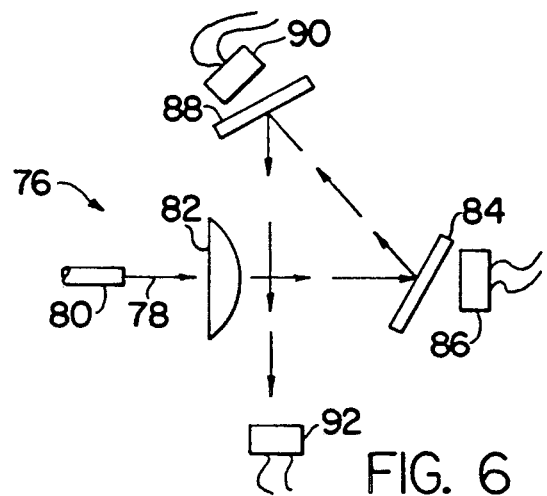
FIG. 6 is a simplified schematic illustration of a third alternative detection module.

A second alternative integrated detection module 68 similar to that described With respect to FIG. 4 is shown in FIG. 5. The detection module 68 is characterized by the same geometry as the detection module 50, except that side reflector 70 is substantially perpendicular to an upper surface 72 of a short wavelength filter 74. A third alternative detection module 76 is shown in FIG. 6. An optical beam 78 is provided by fiber optic cable 80 through focusing lens 82. The optical beam is then presented to a short wavelength filter/reflector 84 which provides the short wavelength sub-beam radiation to a short wavelength detector 86. The filtered sub-beam is presented to a long wavelength filter/reflector 88 such that the long wavelength sub-beam is received by a long wavelength detector 90. The remaining radiation is presented to medium wavelength detector 92.

The present invention temperature correction technique subtracts the reflected component from the total radiative signal. Due to the linear relationships among the various radiative terms and contributions it is convenient to calculate corrected radiant power first and then convert that figure to a temperature value. Two corrected surface temperatures are calculated, one using the short and middle band the other using the middle and long band. If the temperatures agree, the spectral radio used is correct. Otherwise the spectral ratio is increased or decreased, depending on the magnitude and sign of the temperature difference, until convergence occurs.

The following abbreviations are defined hereinbelow:
Es = total blade radiance in short wavelength band
Esb = blade emitted radiation in short wavelength band
Esr = blade reflected radiation in short wavelength band
Em = total blade radiance in middle wavelength band
Emb = blade emitted radiation in middle wavelength band
Emr = blade reflected radiation in middle wavelength band
El = total blade radiance in long wavelength band
Elb = blade emitted radiation in long wavelength band
Elr = blade reflected radiation in long wavelength band
Ems = reflection corrected radiative signal for short and middle bands
Elm = reflection corrected radiative signal for middle and long bands Rms = ratio Emr/Esr
Rlm = ratio Elr/Emr Each radiative signal, short middle and long band, is the sum of the blade emission and the reflected component namely, $$E_{total} = E_{blade} + E_{reflected} \quad (1)$$

For each band we have:

| | | |
|---|---|---|
| Es = Esb + Esr | for the short band | (2) |
| Em = Emb + Emr | for the middle band | (3) |
| El = Elb + Elr | for the long band | (4) |

The term Ems is defined by the following expression;

$$Ems = Em - (Emr/Esr) \, Es \quad (5)$$

The above expression relates the input signal to the blade emission. The quantity in parenthesis in equation 5 is the ratio of the combustor reflection in the spectral bands. The right hand side of equation (5) is expanded to yield:

$$Em - (Emr/Esr) \, Es = Esb - (Emr/Esr) \, Esb \quad (6)$$

The left hand side of equation (6) involves the pyrometer input radiation of the optical beam containing both reflection and blade emitted radiation While the right hand side only relates to blade emission. By the use of equation (6), the input signal has been expressed in terms of blade emission, and consequently, reflection corrected blade temperature.

Figure 7:
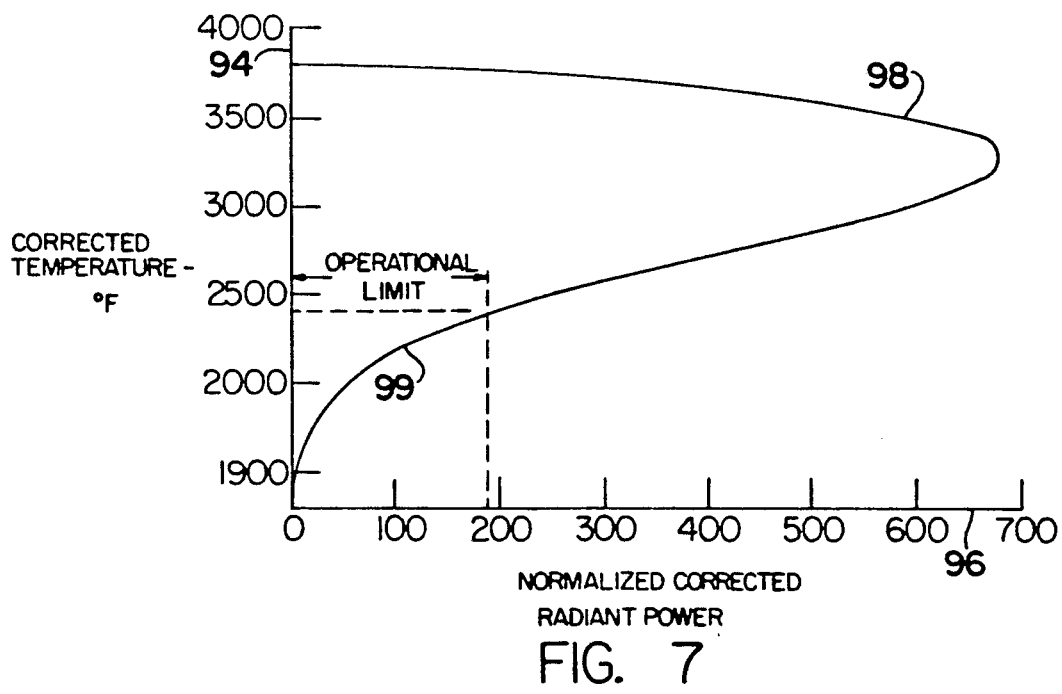
FIG. 7 is a diagrammatic illustration showing the relationship between a corrected temperature and a normalized corrected radiant power for use with the pyrometer of FIG. 1.

FIG. 7 depicts the relation between the corrected blade temperature (axis 94) and the corrected power (Ems) (axis 96). Although the relation (curve 98) is doubled valued, in practice only that a portion of the curve below the melting point of most materials of interest is used, limiting the range of Ems and resulting in a one to one relationship With blade temperature corresponding to an initial Portion 99 of curve 98. A similar relation can be written for the middle and long bands;

$$El - (Elr/Emr) \, Em = Elb - (Elr/Emr) \, Emb \quad (7)$$

$$Elm = El - (Elr/Emr) \, Em \quad (8)$$

The numerical value of the combustor reflection ratios;

$$Rms = Emr/Esr \quad (9)$$

$$Rlm = Elr/Emr \quad (10)$$

depends on the electronic scaling used. To resolve the ambiguity, it is convenient to describe these parameters by the blackbody temperature required to generate a given value Rms or Rlm. This temperature is independent of the scale used for the ratios. Herein and as common in the art, the terms combustor temperature and fireball temperature have been used interchangeably to define the combustor reflection ratio.

An algorithm 100 executed by the processor assumes that both Ems and Elm Will indicate the same blade temperature, provided the correct values for the combustor reflection ratios have been selected. The discrepancy in blade temperature between measurement bands can be used to calculate the actual value of the combustor temperature provided;

(1) The spectral characteristics of the source of reflection are significantly different from the blade emission.

(2) All surfaces are opaque with known emittance.

Figure 8:
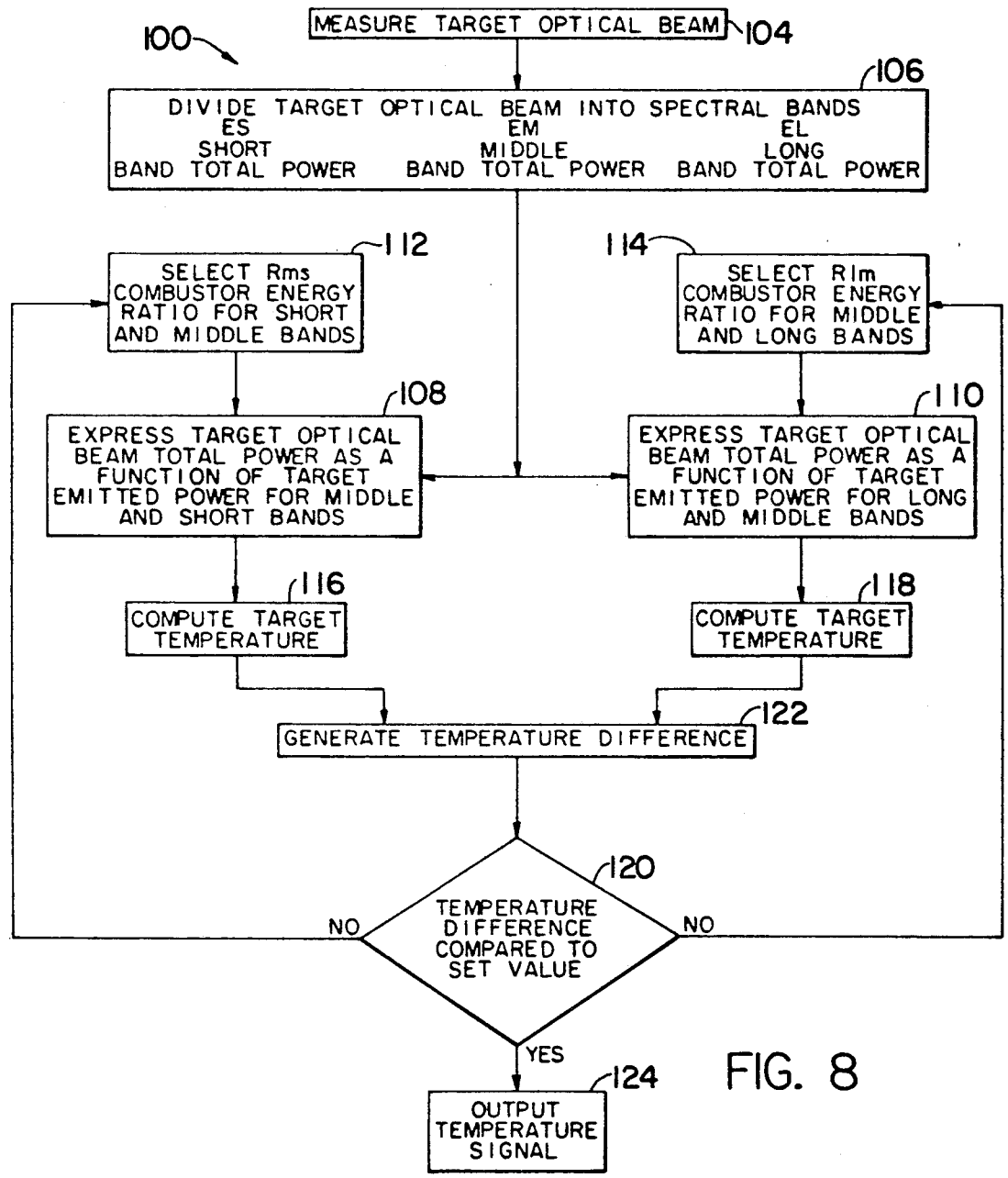
FIG. 8 is a diagrammatic illustration of an algorithm executed by a signal processor found with the optical pyrometer of FIG. 1.

The algorithm 100 used to obtain the combustor reflection ratios and corrected blade temperature is diagrammatically shown in FIG. 8. The target optical beam is measured at block 104 by the detection module which generates optical sub-beam signal equivalents (Es, Em and El) for each of the three spectral areas (block 106). The signals Es, Em, El and the combustor reflected ratios Rms (block 112) and Rlm (block 114) are used to calculate Ems and Elm as described previously (blocks 108, 110). The initial Rms and Rlm value used to calculate Ems and Elm is the same as for the last set of Es, Em and El signal values. During processor start-up nominal values of Rms and Rlm are selected. The reflection corrected blade temperatures TTms and TTlm, are stored as a function of Rms, Ems and Rlm, Elm in the computer memory in look-up table format. For each set of Rms, Ems values the corresponding TTms is read from a corresponding look-up table (block 116). The same procedure is used for Rlm, Elm data pair (block 118). The following test is performed at block 120 and uses the difference between corrected temperatures TTms and TTlm calculated at block 122 to verify that the correct values of Rms and Rlm Were used.

| | |
|---|---|
| Delta T | Is user selectable and defines the temperature resolution to which the correction is performed. |
| Case 1 | |
| If {TTms − TTlm} > Delta T | Then the selected value for combustor reflection ratios Rsm and Rml are low. |
| Case 2 | |
| If {TTms − TTlm} < Delta T | Then the selected value for combustor reflection ratios Rsm are high. |
| Case 3 | |
| If Delta T > = {TTms − TTlm} > = − (Delta T) | Then combustor reflection ratios are correct. No further processing is necessary. |

For cases 1 and 2 the combustor reflection ratios are adjusted accordingly and a new set of values Ems, Elm calculated using the same Es, Em and El but with the new values of Rms and Rlm. The process is repeated until the conditions of case 3 are met. For case 3 the iteration s finished and two corrected temperatures TTms and TTlm signal values are available (block 124). The temperature TTlm is used as the corrected blade temperature because the fraction of reflected energy is less in Elm than in Ems, and the effect of correction errors is significantly reduced.

TRISAP PERFORMANCE

Table 1 compares the TRISAP performance to the present DSAP pyrometer system. The DSAP has a correction uncertainty of ±25 deg F. at 50 percent reflection for a combustor temperature fluctuation o: ±200 deg F. at 3800 deg F. At 80 percent reflection the uncertainty increases to 85 deg F. In contrast the TRISAP reduces the uncertainty to 10 deg F. at these conditions by measuring the combustor reflection ratio. FIG. 9 shows a typical envelope for determining the combustor temperature. Curves 130, 132 mark the bounds of the computed temperature difference as generated by the present pyrometer. If, in FIG. 9, the absolute value of the difference between the corrected temperatures TTms and TTlm is 20 deg F. or less, the combustor temperature can be measured to ±250 deg F. at 50 percent reflection, resulting in an uncertainty in TTml of ±10 deg F. At 80 percent reflection the combustor temperature can be measured to ±60 deg F. resulting in a ±10 deg F. uncertainty in TTlm.

TABLE 1

| COMPARISON OF DSAP AND TRISAP PERFORMANCE | | |
|---|---|---|
| | DSAP | TRISAP |
| principle of operation | two spectral bands fix combustor temp | three spectral bands combustor temp calculated |
| correction accuracy deg F. at % reflection | +25 deg F. at 50% reflection | +10 deg F. at 80% reflection |
| threshold temp | 1300 deg F. | 800 deg F. |
| threshold for reflection correction | 1500 deg F. | 1500 deg F. |

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A pyrometer for measuring the temperature of a remote target having a known value of emissivity, comprising:

an optical guide means for receiving a target optical beam having a spectral width, and a beam power including an emitted component and a reflected component;

a detection module means including a means for dividing said target optical beam into three optical sub-beams each having a subportion of the optical beam spectral width and power, said detector means for providing respective electrical signal equivalents of said received power in said optical sub-beams;

a signal processing means having a memory means for storing signals including signals indicative of a plurality of target temperature value signals corresponding to associated ones of a plurality of reflection corrected energy signal magnitudes for each one of said optical beam spectral width subportions and reflected energy ratio signals indicative of the ratio of reflected energy signal magnitudes between said optical beam spectral width subportion; said signal processing means for selecting initial values of said ratios of reflected energy signal magnitudes between said optical beam spectral width subportions;

computing target emitted beam power as a function of said measured optical beam power;

calculating reflection corrected energy signal magnitudes as the difference signal magnitude between electrical signal equivalents of a second one of said optical sub-beam power signals and the product of a first one of said optical sub-beam power signals and a ratio of reflected power signal values in said first and second optical sub-beams;

identifying, for each of said reflection corrected energy signal magnitudes, corresponding ones of said plurality of target temperature value signals;

comparing a resolution temperature difference value signal with a signal corresponding to the difference between said identified target temperature signal values;

if said resolution temperature difference value signal is less than said identified target temperature difference signal value, providing output signals indicative of correct target temperature.

2. The optical pyrometer of claim 1 wherein the optical beam spectral widths of said optical sub-beams respectively comprise short, medium and long wavelength portions of said optical beam spectral width.

3. The optical pyrometer of claim 2 wherein said reflection corrected energy signal magnitudes are respectively computed with said short and medium wavelength portions and medium and long wave length portions of said optical sub-beams.

4. The optical pyrometer of claim 2 wherein said ratio of reflected energy signal magnitudes between said optical beam spectral width subportions are respectively computed with said medium and short wavelength portions and long and medium wavelength portions of said optical sub-beams.

5. The optical pyrometer of claim 1 wherein said target has a surface that is opaque.

6. The optical pyrometer of claim 1 wherein said target has substantially different spectral characteristics as compared to a source of radiation reflected from said target.

7. The optical pyrometer of claim 1 wherein said detector means comprises an Indium-Gallium-Arsenide detector and a silicon detector.

8. The optical pyrometer of claim 2 wherein said detector means spectral widths comprise 0.3 to 0.85 microns for the short wavelength band, 0.85 to 1.0 micron for the middle wavelength spectral width subportion and 1.0 to 1.8 microns the long wavelength spectral width subportion.

9. The optical pyrometer of claim 1 wherein said detector means is configured to serially detect each of said sub-beams.

10. In a pyrometer that measures the temperature of a remote target having a known value of emissivity, said pyrometer having a means for receiving a target optical beam having a spectral width and a beam power including an emitted component and a reflected component, a detection module that divides said target optical beam into three optical sub-beams each having a subportion of the optical beam spectral width, said detector means for providing respective electrical signal equivalents of said divided optical sub-beams, a controller comprising:

a signal processing means having a memory means for storing signals including signals indicative of a plurality of target temperature value signals corresponding to associated ones of a plurality of reflection corrected energy signal magnitudes for each one of said optical beam spectral width subportions and reflected energy signal magnitudes between said optical beam spectral width subportions; and a computation means for;

selecting initial values of said ratios of reflected energy signal magnitudes between said optical beam spectral width subportions;

computing target emitted beam power as a function of said measured optical beam power;

calculating reflection corrected energy signal magnitudes as the difference signal magnitude between electrical signal equivalents of a second one of said optical sub-beam power signals and the product of a first one of said optical sub-beam power signals and a ratio of reflected power signal values in said first and second optical sub-beams;

identifying, for each of said reflection corrected energy signal magnitudes, corresponding ones of said plurality of target temperature value signals;

comparing a resolution temperature difference value signal with a signal corresponding to the difference between said identified target temperature signal values; and if said resolution temperature difference value signal is less than said identified target temperature difference signal value, providing output signals indicative of correct target temperature.

11. The optical pyrometer of claim 10 wherein the optical beam spectral widths of said optical sub-beams respectively comprise short, medium and long wavelength portions of said optical beam spectral width.

12. The optical pyrometer of claim 11 wherein said reflection corrected energy signal magnitudes are respectively computed with said short and medium wavelength portions and medium and long wave length portions of said optical sub-beams.

13. The optical pyrometer of claim 11 wherein said ratio of reflected energy signal magnitudes between said optical beam spectral width subportions are respectively computed with said medium and short wavelength portions and long and medium wavelength portions of said optical sub-beams.

14. The optical pyrometer of claim 10 wherein said target has a surface that is opaque.

15. The optical pyrometer of claim 10 wherein said target has substantially different spectral characteristics as compared to a source of radiation reflected from said target.

16. The optical pyrometer of claim 10 wherein said detector means comprises an Indium-Gallium-Arsenide detector and a silicon detector.

17. The optical pyrometer of claim 11 wherein said detector means spectral Widths comprise 0.3 to 0.85 microns for the short wavelength band, 0.85 to 1.8 micron for the middle wavelength spectral width subportion and 1.0 to 1.8 microns for the long wavelength spectral width subportion.

18. The optical pyrometer of claim 10 wherein said detector means is configured to serially detect each of said sub-beams.

19. A detection module for use with an optical pyrometer that provides, along an optical guide, an optical beam having a spectral width, said detection module comprising:

a housing having an interior cavity;

first and second detector means for respectively providing electrical signal equivalents of long and medium wavelength portions of said optical beam spectral width, said first and second detector means positioned in the housing in registration with one another at a first end of the cavity and receiving the optical beam at a oPtically transparent portion thereof;

a filter means for receiving and passing therethrough only a short wavelength portion of said optical beam, with the remainder thereof reflected from said filter means, and a third detector means registered with said filter means for providing electrical signal equivalents of a short wavelength portion of said optical beam;

said reflected optical beam being presented to said second detector means at an inner cavity surface thereof, with only said long wavelength optical beam portion being transmitted therethrough to said first detector means.

20. The detection module of claim 19 Wherein said housing further comprises a reflective surface on said cavity interior wall.

21. The detection module of claim 20 wherein said reflective surface is substantially perpendicular to said filter means.

22. The detection module of claim 20 wherein said reflective surface includes and obtuse angle opening inward into said cavity.

* * * * *

UNITED STATES PATENT AND TRADEMARK OFFICE
CERTIFICATE OF CORRECTION

PATENT NO. : 5,125,739

DATED : June 30, 1992

INVENTOR(S) : Ernesto Suarez-Gonzalez, et al

It is certified that error appears in the above-identified patent and that said Letters Patent is hereby corrected as shown below:

Col. 8, line 60, "o:" should read --of--.

Col. 10, line 58, "energy signal" should read --energy ratio signals indicative of the ratio of reflected energy signal--.

Col. 11, line 42, "1.8 mi-" should read --1.0 mi- --.

Col. 12, line 18, "a oPtically" should read --an optically--.

Signed and Sealed this

Thirty-first Day of August, 1993

Attest:

BRUCE LEHMAN

*Attesting Officer*    *Commissioner of Patents and Trademarks*